US006702516B1

(12) United States Patent
Harrison

(10) Patent No.: US 6,702,516 B1
(45) Date of Patent: Mar. 9, 2004

(54) STRIPING LAY OUT MACHINE

(76) Inventor: Paul A. Harrison, 368 Mockingbird La., Madison, MS (US) 39110

( * ) Notice: Subject to any disclaimer, the term of this patent is extended or adjusted under 35 U.S.C. 154(b) by 0 days.

(21) Appl. No.: 10/225,342

(22) Filed: Aug. 22, 2002

(51) Int. Cl.$^7$ .................. E01C 23/16; B60K 26/00
(52) U.S. Cl. ........................................................ 404/93
(58) Field of Search .................. 404/93, 94; 180/320, 180/321, 322, 324, 334, 774, 778

(56) References Cited

U.S. PATENT DOCUMENTS

| 2,044,558 | A | | 6/1936 | Ball | |
| 2,791,915 | A | * | 5/1957 | Merry | 74/562.5 |
| 2,940,105 | A | | 6/1960 | Woellwarth | |
| 3,052,077 | A | | 9/1962 | Gustafson et al. | |
| 4,376,007 | A | * | 3/1983 | Eigenmann | 156/497 |
| 4,624,602 | A | | 11/1986 | Kieffer et al. | |
| 4,793,731 | A | * | 12/1988 | Gnesa | 404/83 |
| 4,861,190 | A | | 8/1989 | Glassel | |
| 4,892,251 | A | | 1/1990 | Bresnen | |
| 4,921,066 | A | * | 5/1990 | Conley | 180/322 |
| 5,052,854 | A | | 10/1991 | Correa et al. | |
| 5,203,923 | A | * | 4/1993 | Hartman | 118/669 |
| 5,333,966 | A | | 8/1994 | St-Louis et al. | |
| 6,012,759 | A | * | 1/2000 | Adamek | 296/136 |
| 6,413,012 | B1 | * | 7/2002 | Jones | 404/94 |

* cited by examiner

Primary Examiner—Thomas B. Will
Assistant Examiner—Raymond W Addie
(74) Attorney, Agent, or Firm—Richard C. Litman

(57) ABSTRACT

A striping layout machine is adapted to apply reference marks to a roadway in a safe and expedient manner. The machine has an array of features to enhance the safety of operating personnel as well as passing motorists. Equally effective on surfaces of different types, the machine has the capability to pre-mark as much as twenty miles of roadway in an hour. A unique, telescoping boom produces layout lines which may range from zero to twenty feet. The machine employs a lime and water solution for marking instead of paint. The lime and water solution is not permanent and will wash away at the first rain after the roadway has been striped thereby leaving an unmarred, clean stripe.

14 Claims, 3 Drawing Sheets

STRIPING LAY OUT MACHINE

BACKGROUND OF THE INVENTION

1. Field of the Invention

The present invention generally relates to roadway preparation and maintenance equipment. More specifically, the present invention is drawn to a vehicle for pre-marking pavement with paint marking guides.

2. Description of the Related Art

Installing properly located, painted lines which define the center line and/or lanes on paved road surfaces is a critical element necessary for ensuring highway and road safety. Before the painted lines can be applied, the pavement must be pre-marked with reference lines to determine the precise location where the painted lines should be applied.

Conventionally, pre-marking is mostly accomplished manually and requires that personnel walk along the paved road and employ a tape measure, rope or the like to determine the proper measurements from the curb or edge of the roadway. A can of spray paint is used to pre-mark the pavement. Aside from being time consuming, this endeavor is especially dangerous. Personnel must be constantly vigilant to the hazards which may arise from errant motorists. Further, the paint-sprayed reference markings leave ugly discolorations on the roadway which take a while to wear away. The current industry standard is that a three person team can be expected to cover ten miles per day under normal circumstances.

A machine which requires fewer personnel and can safely apply reference markings at many times the current rate would certainly be a welcome addition to the art.

An example of a system utilized to pre-mark a street is shown in U.S. Pat. No. 5,333,966 (St-Louis et al.). Although the system is mounted on a vehicle, a worker must be positioned and walk along the edge of the roadway while holding a reflector which is mounted on a pole. Alternatively, an array of reflectors is mounted at distances along the edge of the roadway. Mounting the array of reflectors can be costly and time consuming.

U.S. Pat. No. 2,044,558 (Ball), U.S. Pat. No. 2,940,105 (Woellwarth), U.S. Pat. No. 4,861,190 (Glassel), U.S. Pat. No. 4,892,251 (Bresnen) and U.S. Pat. No. 5,052,854 (Correa et al.) all disclose vehicular systems for applying painted stripes to roadways after pre-marking has been accomplished. Note that the Correa et al. system is similar to the system shown in St-Louis et al.

U.S. Pat. No. 4,624,602 (Kieffer et al.) is drawn to a manually-operated line striper especially adapted for parking lots and the like.

U.S. Pat. No. 3,052,077 (Gustafson et al.) disclose a machine for marking lines on grass athletic fields.

None of the above inventions and patents, taken either singularly or in combination, is seen to disclose a striping layout machine as will be subsequently described and claimed in the instant invention.

SUMMARY OF THE INVENTION

The machine of the present invention is adapted to apply reference marks to a roadway in a safe and expedient manner. The machine has an array of features to enhance the safety of operating personnel as well as passing motorists. Totally enclosed therein a maximum of only two persons is required to operate the machine. Equally effective on surfaces of different types, the machine has the capability to pre-mark as much as twenty miles of roadway in an hour. A unique, telescoping feature produces layout lines which may range from zero to twenty feet. The machine employs a lime and water solution instead of paint. The lime and water solution is not permanent and will wash away at the first rain after the roadway has been striped, thereby leaving an unmarred, clean stripe.

Accordingly, it is a principal object of the invention to provide a machine, which machine is adapted to lay out reference markings for striping on roadways.

It is another object of the invention to provide a machine adapted to lay out reference markings, which machine incorporates an array of safety features.

It is a further object of the invention to provide a machine adapted to lay out reference markings, which machine requires a minimum number of personnel.

Still another object of the invention is to provide a machine, which machine is capable of effectively pre-marking roadways at many times the rate currently recognized as the industry standard.

It is an object of the invention to provide improved elements and arrangements thereof for the purposes described which are inexpensive, dependable and fully effective in accomplishing their intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
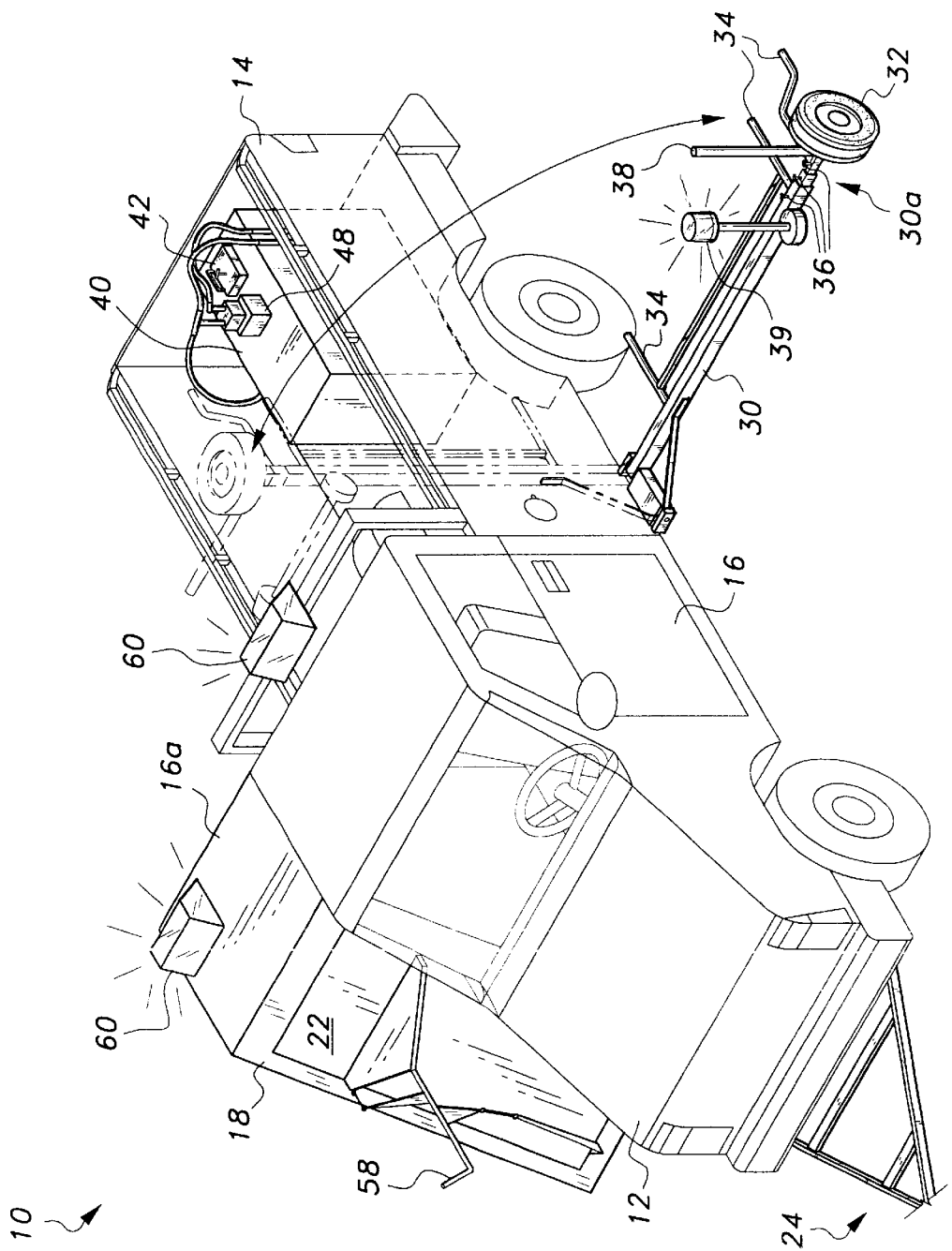
FIG. 1 is an environmental, perspective view of a striping layout machine according to the present invention.
Figure 2:
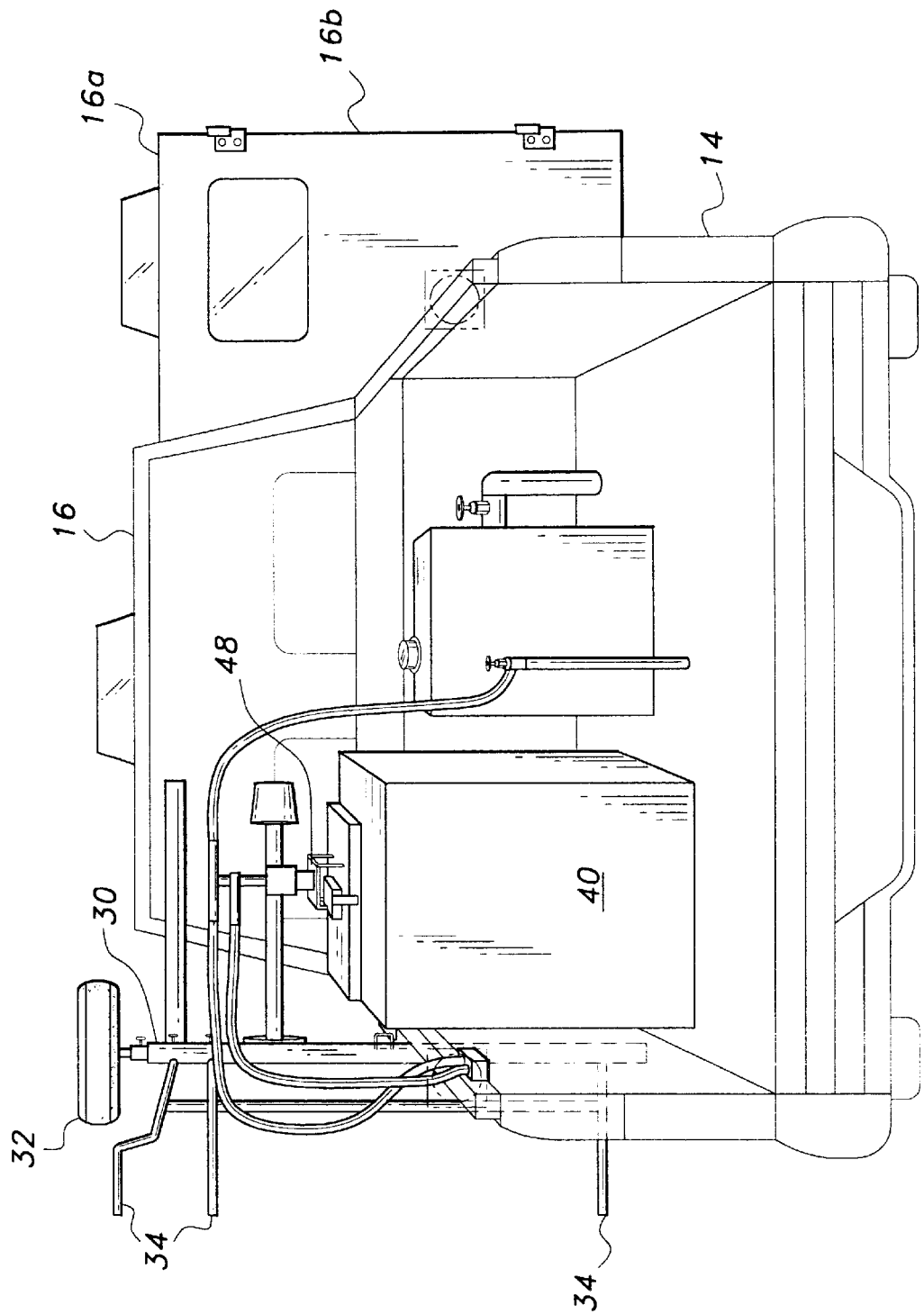
FIG. 2 is a rear, cut-away view of a striping layout machine according to the present invention.
Figure 3:
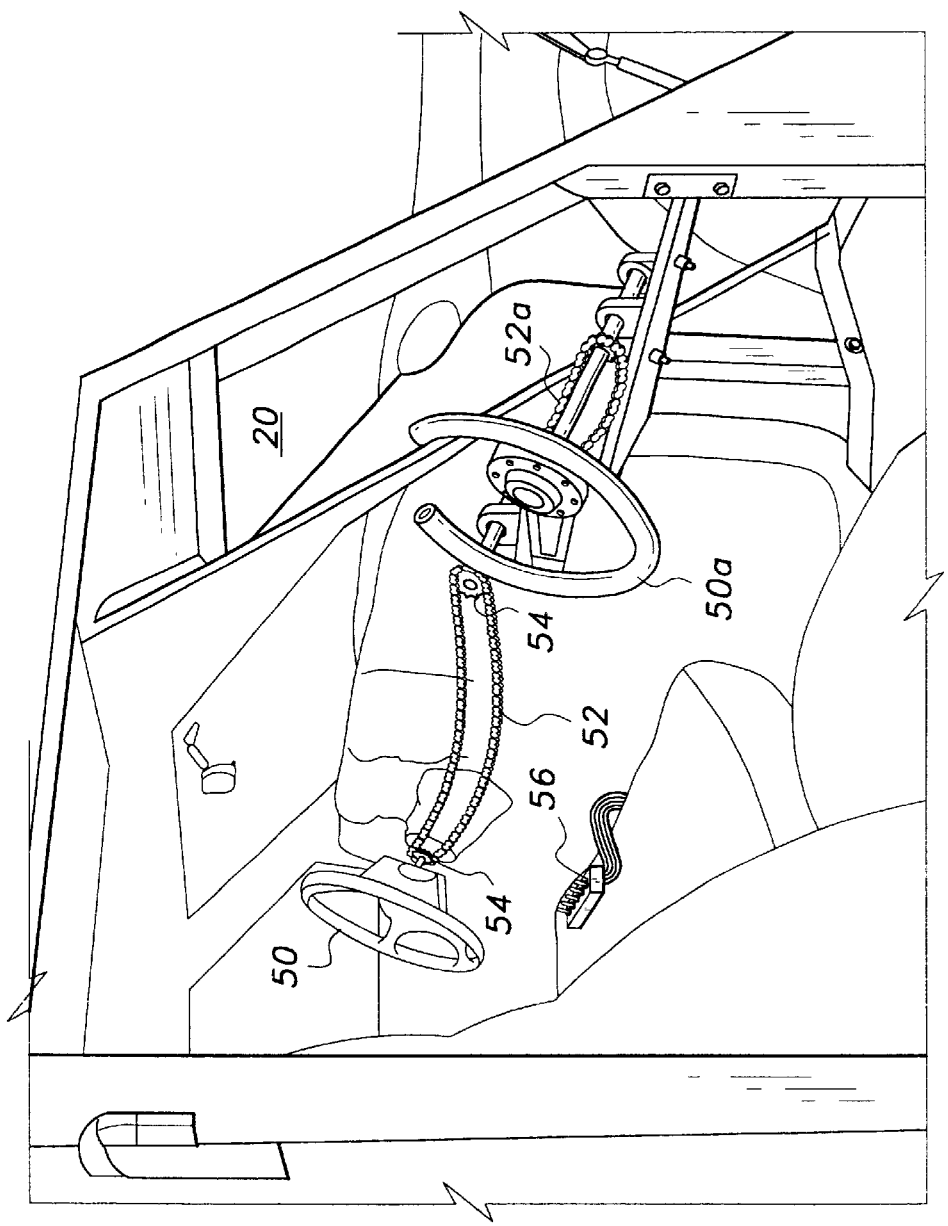
FIG. 3 is a partial, perspective view of the inside of the rider cab of a stripping layout machine according to the present invention.

Attention is first directed to FIGS. 1 and 2 wherein the layout machine of the present invention is generally indicated at 10. Machine 10 comprises a small, four-wheeled, motorized vehicle having a front end 12 and a rear bed 14. The vehicle may be powered by gasoline, electric batteries or natural gas. Although illustrated as open, bed 14 may be provided with a removable cover if desired. Bed 14 is adapted to house a tank 40 adapted to dispense a water-lime marking solution as will be further explained below. An auxiliary cab 16a is connected to and extends from the passenger side of main cab 16. Auxiliary cab 16a is provided with a hinged door 16b to allow entrance and egress therefrom. Auxiliary cab 16a has a slanted front face 18, which front face is provided with a full view safety glass 20 (FIG. 3). A removable cover 22 is provided to cover and protect glass front 20 when the vehicle is being towed via tow bar 24 to a work site.

A boom 30 is positioned on the driver's side of machine 10 and is mounted at its proximate end for pivotal movement on the vehicle. Boom 30 can be pivoted from a vertical storage position to a horizontal in-use position. A tire rest 32, adapted to contact the roadway during use, defines the distal end of boom 30. Boom 30 is equipped with three telescoping sections 30a whereby the boom may be extended to provide markings up to twenty feet from the driver's side of the machine. Three drip tubes 34 are positioned on the boom and are in fluid communication with the drip solution tank 40. Three valve actuators 36 control the flow of marking solution from the tank to the drip tubes 34. A snap-back, solid orange delineator 38 with reflective tape thereon and an orange globe light 39 are disposed on the boom to alert approaching motorists when the boom is in use.

As contemplated, drip solution tank 40 has a capacity of fifty gallons and is provided with a covered filler opening 42. The tank is provided with conventional flow regulators, mixing valves and feed lines to the drip tubes for proper operation. A variable-speed hydraulic mixer 48 is disposed to ensure the proper mixing of the lime-water solution used in the pre-marking function. The requisite hydraulic fluid tank, hydraulic filter, hydraulic pump, etc. are all housed adjacent tank 40 in the bed 14 of the machine.

Attention is now directed to FIG. 3 which best illustrates the control mechanisms inside the main cab 16 and auxiliary cab 16a. The cabs employ steering wheels 50, 50a linked by chains 52, 52a via sprockets 54 whereby the vehicle may be steered from either cab. An array of control switches 56 is conveniently mounted for easy accessibility to both cabs. Control switches 56 function to operate the position of the drip tubes, the valves of the drip tubes, the valves of the solution tank, the hydraulic mixer and all the safety lights. A sight bar 58 is adjustably positioned on the slanted portion of the auxiliary cab so that proper alignment can be maintained with the edge of the roadway. Sight bar 58 may be equipped with an infra-red light beam reflector system if desired. A safety light and/or optional arrow board package 60 are positioned atop the main and auxiliary cab.

It is to be understood that the present invention is not limited to the embodiment described above, but encompasses any and all embodiments within the scope of the following claims.

I claim:

1. A striping layout machine comprising:
   a motorized vehicle, said vehicle having a driver's side, a passenger's side, a front end and a rear end, said rear end formed as an open bed;
   a main cab, said main cab enclosing said driver's side and said passenger's side;
   an enclosed auxiliary cab, said auxiliary cab attached to said main cab and extending from said passenger's side, said auxiliary cab having a slanted front face defined by a full-view safety glass;
   a protective cover, said protective cover removably disposed to cover said front face of said auxiliary cab;
   an adjustable sight bar, said adjustable sight bar attached to said front face of said auxiliary cab; and
   means mounted on said vehicle for applying reference marks to a roadway.

2. A striping layout machine as recited in claim 1, wherein said means for applying reference marks includes a boom, said boom having a proximate end and a distal end, said proximate end mounted for pivotal movement to an exterior portion of the vehicle on the driver's side.

3. A striping layout machine as recited in claim 2, wherein a tire rest defines said distal end of said boom.

4. A striping layout machine as recited in claim 3, wherein said boom comprises plural telescoping sections.

5. A striping layout machine as recited in claim 4, including plural drip tubes and valves therefor positioned on said boom.

6. A striping layout machine as recited in claim 5, including an globe light and a reflector mounted on said boom.

7. A striping layout machine as recited in claim 6, wherein said means for applying reference marks includes a tank disposed in said open bed, said tank adapted to supply a water and lime solution to said plural drip tubes.

8. A striping layout machine comprising:
   a motorized vehicle, said vehicle having a driver's side, a passenger's side, a front end and a rear end, said rear end formed as an open bed;
   a main cab, said main cab enclosing said driver's side and said passenger's side;
   an enclosed auxiliary cab, said auxiliary cab attached to said main cab and extending from said passenger's side, said auxiliary cab having a slanted front face defined by a full-view safety glass;
   a protective cover, said protective cover removably disposed to cover said front face of said auxiliary cab;
   an adjustable sight bar, said adjustable sight bar attached to said front face of said auxiliary cab;
   first means mounted on said vehicle for applying reference marks to a roadway; and
   second means disposed in said main cab for controlling operation of said first means.

9. A striping layout machine as recited in claim 8, wherein said first means for applying reference marks includes a boom, said boom having plural telescoping sections, a proximate end and a distal end, said proximate end mounted for pivotal movement to an exterior portion of the vehicle on the driver's side, said distal end terminating in a tire rest;
   plural drip tubes positioned on said boom;
   valve members positioned on said boom for controlling a flow of a marking fluid to said plural drip tubes; and
   a tank disposed in said open bed, said tank adapted to supply said flow of marking fluid to said plural drip tubes.

10. A striping layout machine as recited in claim 9, including a globe light disposed on said boom and at least one warning light disposed on said main cab.

11. A striping layout machine as recited in claim 10, wherein said second means comprises a set of switches for operating said telescoping sections, said valve members, said globe light and said warning light.

12. A striping layout machine as recited in claim 11 including dual steering wheels for guiding said vehicle, a respective one of said steering wheels positioned in each said main cab and said auxiliary cab.

13. A striping layout machine as recited in claim 12, wherein said dual steering wheels are linked by a chain and sprocket apparatus.

14. A striping layout machine as recited in claim 13, wherein said auxiliary cab is provided with an access door.

* * * * *